United States Patent Office 2,791,531
Patented May 7, 1957

2,791,531

ERYTHROMYCIN THIOCYANATE AND COMPOSITIONS CONTAINING SAME

Jean Q. Bellard, Indianapolis, Ind., assignor to Eli Lilly and Company, Indianapolis, Ind., a corporation of Indiana No Drawing. Application October 22, 1953,
Serial No. 387,783

4 Claims. (Cl. 167—65)

This invention relates to salts of erythromycin and more particularly to erythromycin thiocyanate.

It is known that erythromycin cannot be administered intramuscularly because of the irritation and tissue damage which are caused at the site of injection of erythromycin and its heretofore known acid addition salts. Although oral preparations of erythromycin are widely used, it is often desirable to provide parenterally injectable preparations in order to obtain rapidly a therapeutically effective blood level of the antibiotic, and to treat moribund patients or patients who for one reason or another are unable to tolerate oral medication.

I have discovered that the thiocyanate salt of erythromycin gives rise to substantially no irritation or tissue damage when injected intramuscularly in the form of solutions or suspensions with pharmaceutical extending media. In addition, erythromycin thiocyanate is relatively nontoxic, when compared to other salts of erythromycin. Moreover, preparations including erythromycin thiocyanate exert antibiotic activity proportional to the amount of erythromycin present in that salt. It is therefore unnecessary to employ amounts of the thiocyanate salt of erythromycin which are greatly in excess of the amount of erythromycin required to produce a given blood level, as is the case with oral preparations.

Erythromycin thiocyanate is readily prepared by methods of double decomposition, according to the usual methods of the art. Thus, for example, a salt of erythromycin can be treated with a readily ionizable salt of thiocyanic acid in mutual inert polar solvent solution, whereupon a double decomposition reaction takes place and erythromycin thiocyanate, which is of relatively low solubility, precipitates.

Suitable inert solvents for the preparation of erythromycin thiocyanate include water, lower aliphatic ketones, ethers, alcohols, esters and similar polar solvents in which erythromycin and the source of thiocyanate ions are somewhat soluble. Sources of thiocyanate ions are exemplified by alkali metal thiocyanates, alkaline earth metal thiocyanates and the like.

Erythromycin thiocyanate is, generally speaking, less soluble than erythromycin and is readily isolated by cooling the reaction mixture, with ice, if necessary, and removing the product by filtration. For recovery of the maximum amount of the reaction product, the solvent can be partially or completely evaporated. Alternatively, if erythromycin thiocyanate is relatively soluble in the solvent employed, there can be added to the reaction mixture an inert miscible solvent in which erythromycin thiocyanate is substantially insoluble, to cause precipitation thereof.

The new erythromycin salt of this invention is stable in dry form, and is stable for extended periods when dissolved or suspended in pharmaceutical vehicles suitable for parenteral administration, even when stored at room temperature.

The following examples will show the preparation and properties of erythromycin thiocyanate and pharmaceutical compositions including erythromycin thiocyanate.

EXAMPLE 1

*Preparation of erythromycin thiocyanate*

To a suspension of 200 g. of erythromycin in 3 liters of distilled water were added with stirring a sufficient amount of glacial acetic acid to bring the pH of the solution to about pH 7.0. The resulting solution was filtered, and to the filtrate were added 20 g. of sodium thiocyanate. The mixture was stirred until precipitation of the erythromycin thiocyanate crystals formed in the reaction was complete. The precipitated salt was removed by filtration and washed with successive 250 cc. portions of water. The washed erythromycin thiocyanate was then air dried and powdered for subsequent use.

Erythromycin thiocyanate thus prepared melted at about 166–167° C. The salt is relatively soluble in polyethylene glycol 200, absolute ethanol, absolute methanol, and pyridine. It is relatively insoluble in chloroform, benzene, naphtha, ethyl acetate, ether, glycerin, acetone, and toluene. Erythromycin thiocyanate is soluble to the extent of about 0.8 mg. per ml. in water.

Microbiological assay, using *Micrococcus pyogenes* var. aureus, Heatley strain, as a test organism, showed erythromycin thiocyanate contained about $900\mu$/mg. of antibiotic activity.

For therapeutic use, erythromycin thiocyanate is administered intramuscularly as a suspension or solution in a parenterally acceptable vehicle. Because the salt is only slightly soluble in water, suspensions are necessary when aqueous vehicles are to be used, in order to provide therapeutically adequate amounts of the antibiotic without excessive amounts of the vehicle. While aqueous suspensions are quite stable on standing, even at room temperature, it may be desirable to employ substantially anhydrous vehicles in which erythromycin thiocyanate is soluble. I have found that the liquid polyethylene glycols are especially desirable for preparing solutions of erythromycin thiocyanate for intramuscular injection. Such liquid polyethylene glycols have an average molecular weight in the range of from 200 to 700.

To insure maximum shelf life of liquid pharmaceutical preparations including erythromycin thiocyanate, the compositions are maintained at about pH 7.0 by the addition of buffering agents, if required. The use of strongly acidic or basic vehicles, beside causing undesirable irritation, brings about decomposition of the thiocyanate salt and loss in antibiotic activity.

It is further desirable to incorporate in the parenteral compositions of this invention a local anesthetic to avoid such minor discomfort and irritation as may be produced by intramuscular injection of the antiobiotic compound. Any of the anesthetics suitable for injection can be thus employed, but the most satisfactory anesthetics appear to be those described in the copending U. S. patent application of Albert Pohland, Serial No. 319,783, filed November 10, 1952. To afford ready solubility in the polyethylene glycol vehicle, the local anesthetics generally are employed in the form of their free bases.

Adjuvants and other additaments such as preservatives, suspending agents, buffering agents and the like can be incorporated in the therapeutic compositions containing erythromycin thiocyanate, according to the well-known practices of the art.

The following composition is illustrative of the preferred preparations for intramuscular administration.

EXAMPLE 2

A solution suitable for intramuscular administration, and having excellent stability charactersties when stored at room temperature, is obtained by mixing the following ingredients in the proportions given, and filtering the solution through a Seitz filter into a sterile container to sterilize the solution.

| | |
|---|---|
| Erythromycin thiocyanate | mg__ 63 |
| 1-benzamido-1-phenly-3-piperidinopropane | mg__ 20 |
| Polyethylene glycol 200, q. s. to make | ml__ 1 |

Intramuscular administration of about 1 ml. of the above composition provides the equivalent of about 50,000 units of erythromycin and produces a therapeutically effective blood level of the antibiotic.

EXAMPLE 3

An aqueous suspension suitable for intramuscular administration is prepared by admixture of the following ingredients:

| | |
|---|---|
| Erythromycin thiocyanate | mg__ 50 |
| Polyvinyl pyrrolidone | mg__ 100 |
| 1 - benzamido - 1 - phenyl - 3 - piperidinopropane hydrochloride | mg__ 10 |
| Sterile distilled water, q. s. to make | ml__ 1 |

An aqueous suspension results, which, when administered intramuscularly, provides the equivalent of about 40,000 units of erythromycin and produces a therapeutically effective blood level of the antibiotic. The suspension retains substantially all of its antibiotic potency after standing for twenty-six weeks at room temperature.

The concentration of erythromycin thiocyanate in the pharmaceutical preparations which are to be used can be varied over a wide range. Preferably, however, an amount is used which is equivalent to from about 10,000 to about 100,000 micrograms of antibiotic per ml. of composition. For distribution to the trade, the compositions are conveniently made up in single dose vials containing one to two ml. of the composition, or in multiple dose vials containing 10 ml. or more.

I claim:

1. Erythromycin thiocyanate.
2. A therapeutic composition comprising erythromycin thiocyanate, an injectable local anesthetic compound and an injectable pharmaceutical vehicle.
3. A therapeutic composition comprising a suspension of erythromycin thiocyanate in an injectable aqueous pharmaceutical vehicle containing a local anesthetic compound.
4. A therapeutic composition comprising liquid polyethylene glycol having average molecular weight ranging from about 200 to 700, erythromycin thiocyanate and an injectable local anesthetic compound.

References Cited in the file of this patent

UNITED STATES PATENTS

| | | |
|---|---|---|
| 2,516,080 | Sobin | July 18, 1950 |
| 2,653,899 | Bunch et al. | Sept. 29, 1953 |

FOREIGN PATENTS

| | | |
|---|---|---|
| 1,031,467 | France | June 24, 1953 |

OTHER REFERENCES

Fitzgerald: "Inactivation of Streptomycin by Cyanate," J. Biol. Chem., vol. 176 (1948) pp. 223–228.